United States Patent [19]

Misumi et al.

[11] Patent Number: 4,970,902
[45] Date of Patent: Nov. 20, 1990

[54] KARMAN'S VORTEX FLOW METER

[75] Inventors: Masao Misumi, Tokyo; Yoshiaki Asayama, Hyogo, both of Japan

[73] Assignees: Mitsubishi Denki Kabushiki Kaisha; Oval Engineering Co., Ltd., Tokyo, Japan

[21] Appl. No.: 445,506

[22] Filed: Dec. 4, 1989

[30] Foreign Application Priority Data

Dec. 5, 1988 [JP] Japan ................... 63-307223
Dec. 5, 1988 [JP] Japan ................... 63-158223[U]

[51] Int. Cl.$^5$ .............................................. G01F 1/32
[52] U.S. Cl. .................................................. 73/861.23
[58] Field of Search ....................... 73/861.22, 861.23

[56] References Cited

U.S. PATENT DOCUMENTS 3,886,794 6/1975 McShane ........................ 73/861.23
3,965,730 6/1976 Innes .
4,380,934 4/1983 Okuda et al. .

FOREIGN PATENT DOCUMENTS 0121780 9/1979 Japan ........................ 73/861.23
1384105 2/1975 United Kingdom .
1569125 6/1980 United Kingdom .
2125549 3/1984 United Kingdom .
2155635 9/1985 United Kingdom .
2218518 11/1989 United Kingdom .

*Primary Examiner*—Herbert Goldstein
*Attorney, Agent, or Firm*—Sughrue, Mion, Zinn, Macpeak and Seas

[57] ABSTRACT

A Karman vortex flow meter comprises a vortex generating post 4 disposed in a fluid conduit 1, a plurality of ultrasonic wave transmitters 6a, 6b provided in a wall of the conduit downstream of the post, and an ultrasonic wave receiver 8 provided in a wall of the conduit opposing the transmitters. The transmitters are either juxtaposed at a horizontal sectional face of the conduit and generated ultrasonic waves simultaneously toward the receiver, or they are provided in series in an axial direction of the conduit while the receiver is provided opposite the transmitter on the downstream side. In the latter embodiment the transmitters are connected to a changeover circuit which switches from the downstream transmitter to the upstream one when the detected frequency of the Karman vortex streets in the fluid exceeds a predetermined value.

6 Claims, 3 Drawing Sheets

KARMAN'S VORTEX FLOW METER

BACKGROUND OF THE INVENTION

1. Field of the Invention

This invention relates to a Karman vortex flow meter which detects a generation frequency of Karman vortex streets with an ultrasonic wave to measure a flow velocity or flow rate of fluid flowing in a conduit.

2. Description of the Prior Art

Conventionally, a Karman vortex flow meter of the type mentioned is disclosed, for example, in Japanese Utility Model Publication No. 48-17010, Japanese Patent Publication No. 55-11206 or Japanese Patent Publication No. 56-34046. Those devices are each constituted such that an ultrasonic wave generated by an ultrasonic wave transmitter is received by a receiver.

It is proposed in Japanese Patent Publication No. 56-34046 to dispose a transmitter and a receiver at displaced locations side taking into consideration that an ultrasonic wave which is emitted from the transmitter and propagated across fluid flowing in the conduit is deflected to the downstream side due to a flow velocity of the fluid.

Since the conventional Karman vortex flow meters have such a construction as described above, if the receiver is disposed, for example, at a position at which it can receive an ultrasonic wave propagating thereto through a flow with its highest sensitivity when the flow velocity of fluid flowing in the conduit is comparatively low, then when the flow of the fluid becomes high, an ultrasonic wave which is deflected by the flow cannot be received with a high sensitivity.

Therefore, it is a common practice that the output power of an ultrasonic wave of the transmitter is enhanced or that the location of the receiver is modified so as to facilitate reception of the ultrasonic wave.

However, when the first method is taken, in other words, if a voltage higher than a rated value is applied to the transmitter to increase the output power of an ultrasonic wave, then the transmitter will sometimes suffer from deterioration in characteristic or from failure. Further, since a power supply voltage (terminal voltage of a battery) is normally comparatively low in such a case as the Karman vortex flow meter applied to detect an intake air amount of an engine for an automobile, the voltage to be applied to the transmitter cannot readily be raised to a level higher than the power supply voltage. If the second method is taken, in other words, if the receiver is disposed at a position where the reception sensitivity thereof is in the highest condition when the flow velocity is high, then when the flow velocity becomes low, the reception sensitivity is deteriorated.

SUMMARY OF THE INVENTION

The present invention has been made to eliminate such subjects as described above, and it is therefore an object of the present invention to provide a Karman vortex flow meter which can increase an ultrasonic wave to be generated without applying an excessively high voltage to a transmitter even if a power supply voltage itself is low. It is also another object of the present invention to provide the flow meter which can receive an ultrasonic wave from a transmitter with a high sensitivity irrespective of the flow velocity of fluid.

In a first aspect of the present invention, a Karman vortex flow meter comprises a vortex generating post disposed in a conduit, in which fluid to be measured flows, perpendicularly to a flow of the fluid, a plurality of ultrasonic wave transmitters provided on a wall of the conduit on the downstream side of the vortex generating post for generating ultrasonic waves simultaneously, and an ultrasonic wave receiver provided at a portion of the wall of the conduit opposing the transmitters. Since the plurality of ultrasonic wave transmitters transmit ultrasonic waves of the same frequency simultaneously toward the receiver, the ultrasonic waves to be transmitted toward the receiver can be increased as a combined intense ultrasonic wave without applying an excessively high voltage to the transmitters, whereby the flow meter can accomplish detection of Karman vortex streets even in a flow of a high velocity in such a condition as being wide in dynamic range and high in reliability.

In a second aspect of the present invention, a Karman vortex flow meter comprises a vortex generating post disposed in a conduit, in which fluid to be measured flows, perpendicularly to a flow of the fluid, a first ultrasonic wave transmitter provided on a wall of the conduit on the downstream side of the vortex generating post, a second ultrasonic wave transmitter provided on the wall of the conduit downstream of the first transmitter, an ultrasonic wave receiver provided on the wall of the conduit opposing the second transmitter, and a change-over means for changing over the effective ultrasonic wave transmitter between the first and second ultrasonic wave transmitters in response to a velocity of the fluid in the conduit. Since the transmitter on the downstream side is rendered effective by the change-over means when the flow velocity of the fluid is low, whereas the transmitter on the upstream side is rendered effective when the flow velocity becomes higher than a predetermined flow velocity, an ultrasonic wave transmitted from a transmitter can be received with a high sensitivity by the receiver, and accordingly, an ultrasonic wave generated from a transmitter can be received with a high sensitivity by the receiver irrespective of the flow velocity of the fluid in the conduit, and consequently, the Karman vortex flow meter is high in reliability.

The above and other objects, features and advantages of the invention will become apparent from the following description and appended claims, taken in conjunction with the accompanying drawings which show a preferred embodiment of the invention by way of example.

DETAILED DESCRIPTION OF THE PREFERRED EMBODIMENTS

Figure 1:
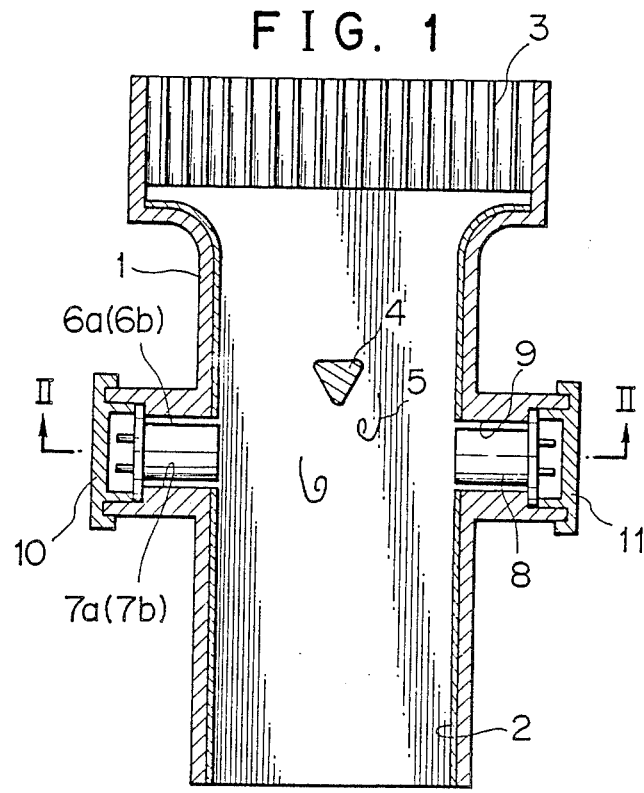
FIG. 1 is a horizontal sectional view of a Karman vortex flow meter according to an embodiment of the present invention.
Figure 2:
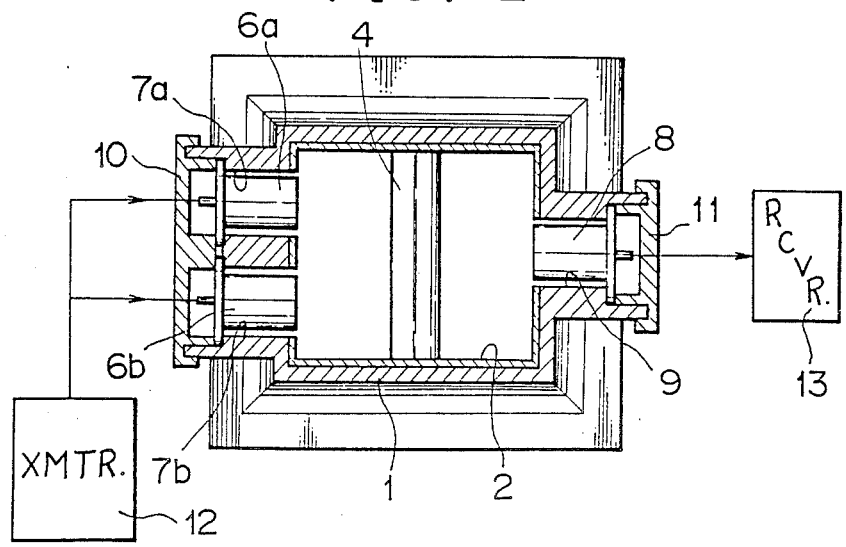
FIG. 2 is a vertical sectional view taken along line II—II of FIG. 1.

In the following, embodiments of the present invention will be described with reference to the drawings. FIG. 1 is a horizontal sectional view of a Karman vortex flow meter of an embodiment in accordance with the first aspect of the present invention, and FIG. 2 is a vertical sectional view taken along line II—II of FIG. 1. In those figures, reference numeral 1 denotes a conduit which is formed as a unitary member by plastic molding and in which fluid to be measured flows, and a sound absorbing material 2 for absorbing an ultrasonic wave is formed on an inner face of a wall of the conduit 1. Reference numeral 3 denotes a rectifier disposed at an upstream portion of the conduit 1 for rectifying and introducing fluid into the conduit 1, 4 is a vortex generating post disposed perpendicularly to a flow of fluid in the conduit 1, and 5 is a Karman vortex street generated by the vortex generating post 4. Reference characters 6a and 6b denote two ultrasonic wave transmitters disposed on the downstream side of the Karman vortex street generating post 4 in a perpendicular direction to a flow of fluid, and the ultrasonic wave transmitters 6a and 6b are accommodated in accommodating holes 7a and 7b formed in the wall of the conduit 1. Reference numeral 8 denotes an ultrasonic wave receiver opposed in an equally spaced relationship to the transmitters 6a and 6b for receiving ultrasonic waves from the transmitters, and ultrasonic wave receiver 8 is accommodated in an accommodating hole 9 formed in the wall of the conduit 1. Reference numeral 10 denotes a cap for the accommodating holes 7a and 7b, and 11 is a cap for the accommodating hole 9. Reference numeral 12 denotes an oscillating circuit device for driving the transmitters 6a and 6b simultaneously, and 13 is a receiving circuit device for amplifying a received signal of the receiver 8 and detecting a generation frequency of Karman vortex streets.

Subsequently, operation will be described. In order to detect a generation frequency of Karman vortex streets 5 generated in a flow of fluid in the conduit 1, ultrasonic waves are generated simultaneously from the transmitters 6a and 6b into the Karman vortex streets. Those ultrasonic waves propagate across the flow while being modulated by the Karman vortex streets and are thus received by the receiver 8. Such ultrasonic waves from the transmitters 6a and 6b propagate with some expansion, and when the velocity of the flow is low, the ultrasonic waves are little deflected by the flow, but if the flow becomes high in velocity, then the ultrasonic wave will be deflected to the downstream side and simultaneously be modulated excessively by the Karman vortex streets which are intensified corresponding to the flow velocity. If such condition is reached, in case the ultrasonic waves received are weak, then the reception becomes difficult. In the above structure according to the present invention, since ultrasonic waves are transmitted simultaneously from the two transmitters 6a and 6b, an intense ultrasonic wave is obtained, and consequently, even if the flow velocity rises, reception of an ultrasonic wave is still easy, and stabilized detection of Karman vortex streets can be accomplished.

Figure 3:
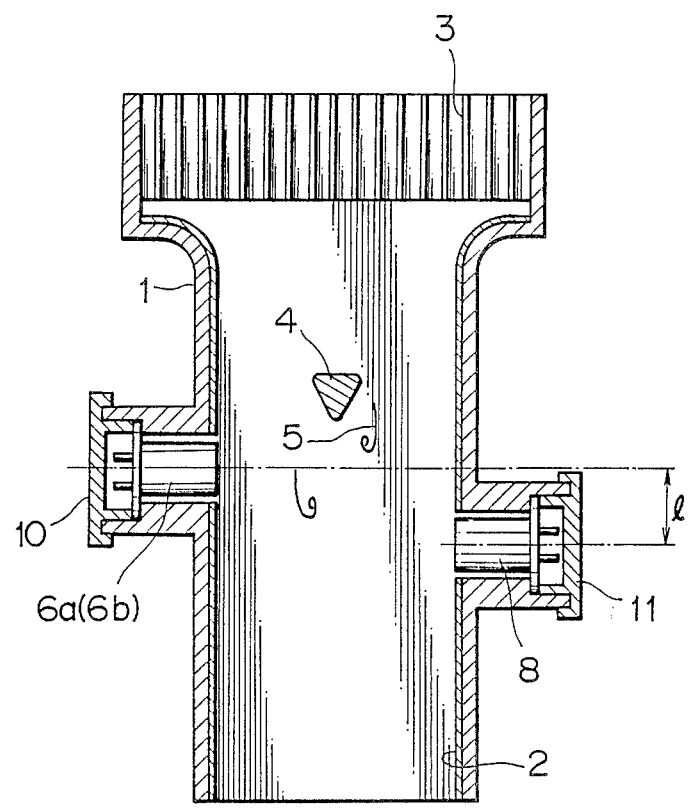
FIG. 3 is a horizontal sectional view of another embodiment.

FIG. 3 shows a horizontal sectional view of a Karman vortex flow meter of another embodiment in accordance with the first aspect of the present invention wherein the position of the receiver 8 is disposed on the downstream side of the transmitters 6a and 6b. With the Karman vortex flow meter, as the receiver 8 is disposed on the downstream side by a distance from the transmitters 6a and 6b taking it into consideration that an ultrasonic wave which propagates across a flow in the conduit 1 is deflected to the downstream side due to the flow velocity of the fluid, detection of Karman vortex streets in a flow of a higher flow velocity than that in the preceding embodiment is enabled.

Figure 4:
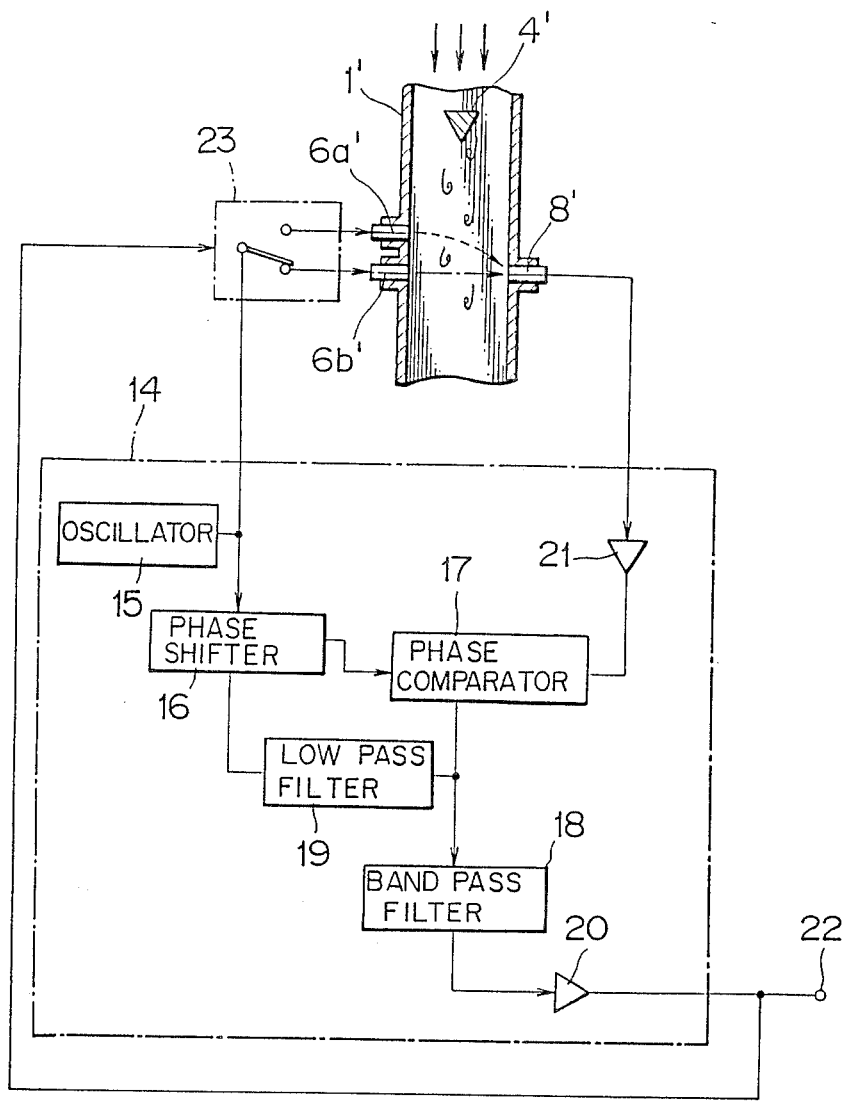
FIG. 4 is constructional view of an entire Karman vortex flow meter according to another embodiment of the present invention.

FIG. 4 shows a constructional view of an entire Karman vortex flow meter in accordance with the second aspect of the present invention. In the figure, reference character 1' denotes a conduit in which fluid to be measured flows, 4' is a vortex generating post disposed substantially perpendicularly to fluid flowing in the conduit 1', 6a' is a first ultrasonic wave transmitter provided on a wall of the conduit 1' for generating an ultrasonic wave into Karman vortex streets generated on the downstream side of the vortex generating post 4', 6b' is a second ultrasonic wave transmitter disposed at a portion of the wall of the conduit on the downstream side of the first ultrasonic wave transmitter, and 8' is an ultrasonic wave receiver disposed on the wall of the conduit 1 opposing the transmitter 6b'. Reference numeral 14 denotes a detecting circuit device, which is constituted from an oscillator 15 for exciting the first and second ultrasonic wave transmitters 6a' and 6b', a phase shifter 16, a phase comparator 17, a band pass filter 18, a low pass filter 19, and amplifiers 20 and 21. Reference numeral 22 denotes an output terminal of the detecting circuit device 14, and a vortex signal output is obtained from the output terminal 22. Reference numeral 23 denotes a change-over means for the two ultrasonic wave transmitters 6a' and 6b', and the change-over means 23 can change over the effective ultrasonic wave transmitter such that, when the frequency of the vortex signal output of the output terminal 22 is low, the second ultrasonic wave transmitter 6b' on the downstream side may be excited by the oscillator 15, but if the frequency of the vortex signal output becomes higher than a predetermined level, then the first ultrasonic wave transmitter 6a' on the upstream side may be excited by the oscillator 15.

Subsequently, operation of the present invention will be described. When the flow velocity of fluid flowing in the conduit 1' is low, the second ultrasonic wave transmitter 6b' is rendered effective by the change-over means 23, and an ultrasonic wave generated from the transmitter 6b' propagates in the fluid while being deflected little by the flow velocity and is thus received by the receiver 8' on the opposing side. However, if the flow velocity becomes high, an ultrasonic wave propagating in the fluid is deflected so that it becomes difficult to receive the ultrasonic wave by the receiver 8'. Therefore, the first ultrasonic wave transmitter 6a' on the upstream side which is so disposed taking it into consideration that an ultrasonic wave is deflected is rendered effective to enable reception by the receiver 8'. In particular, since the generation frequency of Karman vortex streets generated on the downstream side of the vortex generating post 4' increases in proportion to the flow velocity of the fluid to be measured, if the vortex signal output frequency (Karman vortex street generation frequency) obtained from the output terminal 22 becomes higher than a predetermined value, then the effective ultrasonic wave transmitter is changed over from the second ultrasonic wave transmitter 6b' to the first ultrasonic wave transmitter 6a' by the change-over means 23.

Accordingly, an ultrasonic wave generated from a transmitter can be received with a high sensitivity by the receiver irrespective of the flow velocity of the fluid in the conduit, and consequently, the Karman vortex flow meter is high in reliability.

What is claimed is;

1. A Karman vortex flow meter, comprising: a vortex generating post disposed in an elongate conduit, in which fluid to be measured flows, perpendicularly to a flow of the fluid, a plurality of ultrasonic wave transmitters provided on a wall of said conduit on a downstream side of said vortex generating post in orientations perpendicular to the flow of the fluid, and an ultrasonic wave receiver provided on said wall of said conduit opposing said transmitters, wherein said transmitters are disposed in a juxtaposed relationship on the wall of said conduit at a cross-sectional face thereof perpendicular to an axis of the conduit and are connected to an oscillating circuit device for causing said transmitters to generate ultrasonic waves simultaneously toward said receiver, and said receiver is connected to a receiving circuit device for detecting a generation frequency of Karman vortex streets generated by said vortex generating post.

2. A Karman vortex flow meter as claimed in claim 1, wherein said ultrasonic wave receiver is provided at a location spaced downstream by a predetermined distance from said ultrasonic wave transmitters.

3. A Karman vortex flow meter, comprising: a vortex generating post disposed in an elongate conduit, in which fluid to be measured flows, perpendicularly to a flow of the fluid, a plurality of ultrasonic wave transmitters provided on a wall of said conduit on a downstream side of said vortex generating post in orientations perpendicular to the flow of the fluid, and an ultrasonic wave receiver provided on said wall of said conduit opposing said transmitters, wherein said transmitters are disposed in series upstream and downstream in an axial direction of said conduit and are connected to a changeover circuit for alternatively rendering said transmitters effective.

4. A Karman vortex flow meter as claimed in claim 3, wherein said ultrasonic wave receiver is provided in an opposing relationship to the downstream transmitter.

5. A Karman vortex flow meter as claimed in claim 3, wherein said transmitters are alternatively rendered effective automatically when the generation frequency of Karman vortex streets of the fluid becomes higher than a predetermined value.

6. A Karman vortex flow meter as claimed in any one of the preceding claims, wherein the fluid is gas.

* * * * *